United States Patent
Rao et al.

(10) Patent No.: US 12,047,463 B2
(45) Date of Patent: Jul. 23, 2024

(54) DETERMINING CONTENT OUTPUT SESSION OUTLIERS

(71) Applicant: Comscore, Inc., Reston, VA (US)

(72) Inventors: Kumar N. Rao, Ashburn, VA (US); Anjali Gupta, Toronto (CA); Charu Khurana, Pune (IN); Akhil Choday, Pune (IN)

(73) Assignee: Comscore, Inc., Reston, VA (US)

( * ) Notice: Subject to any disclaimer, the term of this patent is extended or adjusted under 35 U.S.C. 154(b) by 241 days.

(21) Appl. No.: 17/412,295

(22) Filed: Aug. 26, 2021

(65) Prior Publication Data

US 2023/0066193 A1 Mar. 2, 2023

(51) Int. Cl.
*H04L 67/50* (2022.01)
*H04N 21/442* (2011.01)
*H04N 21/658* (2011.01)

(52) U.S. Cl.
CPC ..... *H04L 67/535* (2022.05); *H04N 21/44204* (2013.01); *H04N 21/44224* (2020.08); *H04N 21/6581* (2013.01)

(58) Field of Classification Search
CPC ............ H04L 67/535; H04N 21/44224; H04N 21/44204; H04N 21/6581
See application file for complete search history.

(56) References Cited

U.S. PATENT DOCUMENTS

| 10,172,150 B2* | 1/2019 | Belghoul | H04L 1/0002 |
|---|---|---|---|
| 10,902,062 B1* | 1/2021 | Guha | G06F 16/9027 |
| 2018/0240041 A1* | 8/2018 | Koch | G06N 3/126 |
| 2019/0273954 A1* | 9/2019 | Evans | H04N 21/25883 |
| 2022/0303618 A1* | 9/2022 | Whitely | H04N 21/6582 |

* cited by examiner

*Primary Examiner* — Jefferey F Harold
*Assistant Examiner* — Franklin S Andramuno
(74) *Attorney, Agent, or Firm* — Blank Rome LLP

(57) ABSTRACT

Data indicative of a plurality of content output sessions associated with a first time period may be received. Based on the received content output session data, a first subset of the plurality of content output sessions that are outliers may be determined. Data associated with a device associated with each of the first subset of content output sessions may be received. Based on the received device data, each device may be classified as an outlier device or an inlier device. Based on the classification, a second subset of the first subset of content output sessions that are associated with an outlier device may be determined. A duration of each content output session of the second subset may be compared to a duration threshold associated with a second time period. Based on the comparison, a total duration of the content output sessions of the second subset may be adjusted.

19 Claims, 8 Drawing Sheets

| App Name | Duration Hours | | |
|---|---|---|---|
| | Inlier | Outlier | Total |
| Hulu (Mobile App) | 115 | | 115 |
| Netflix (Mobile App) | 87 | 430 | 517 |

| Threshold(T) | Nov | Dec | Jan | Feb | Mar | Apr | Median |
|---|---|---|---|---|---|---|---|
| Hrs | 10.99 | 10.98 | 7.99 | 8.98 | 8.98 | 8.98 | 8.98 |

DETERMINING CONTENT OUTPUT SESSION OUTLIERS

BACKGROUND

Internet-activity monitoring techniques may include a server-side consumer data collection strategy in which an individual Internet content provider ("website") monitors and collects data about consumers. Additionally, or alternatively, data collection directly from an Internet consumer's device or computer has also been proposed, e.g., client-side data collection. A strategy that seeks to capture more comprehensive data regarding network traffic may involve the use of an intermediary domain, which serves as a pass-through for traffic into and out of the network. However, each of these internet-activity monitoring systems may be unable to accurately determine content output session outliers. Accordingly, improvements in techniques for determining content output session outliers may be desirable.

SUMMARY

Methods and systems are disclosed for determining content output session outliers. Data indicative of a plurality of content output sessions associated with a first time period may be received. The received content output session data may indicate a content identifier and a duration of each content output session. A first subset of the plurality of content output sessions that are outliers may be determined based on the received content output session data. Data associated with a device associated with each of the first subset of content output sessions may be received. Each device may be classified as an outlier device or an inlier device based on the received device data. A second subset of the first subset of content output sessions that are associated with an outlier device may be determined based on the classification. A duration of each content output session of the second subset may be compared to a duration threshold associated with a second time period, wherein the second time period includes the first time period. A total duration of the content output sessions of the second subset may be adjusted based on the comparison.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 5 illustrates an example of a chart displaying data indicative of device behavior.

DETAILED DESCRIPTION OF ILLUSTRATIVE EMBODIMENTS

Figure 1:
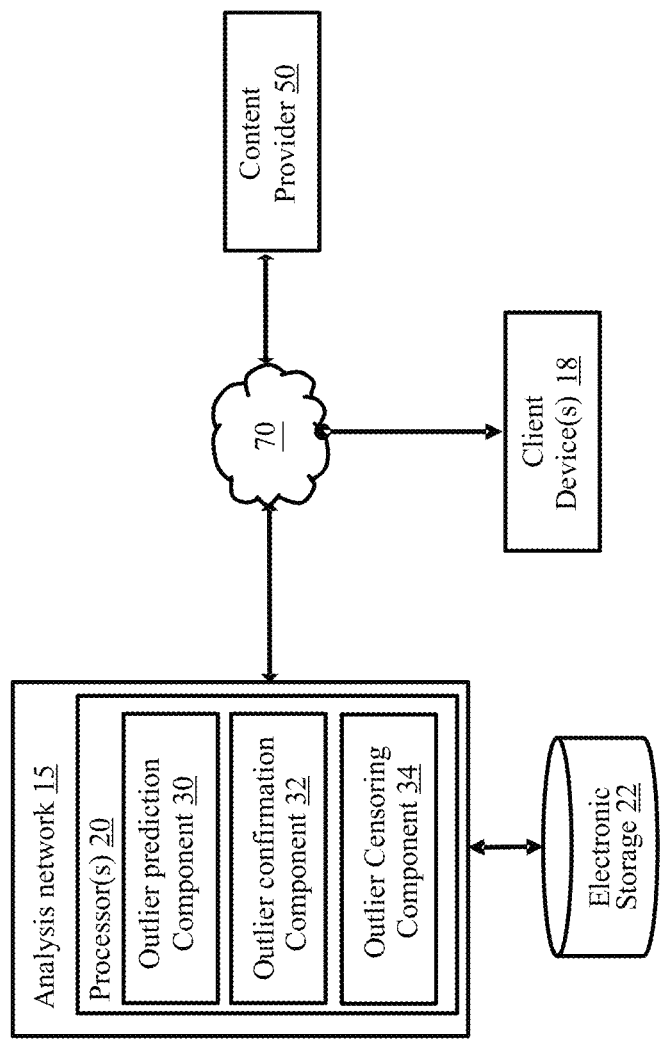
FIG. 1 illustrates a block diagram of an example environment.

It may be desirable to gain an understanding of content consumption behavior. For example, it may be desirable to gain an understanding of content consumption behavior related to a particular application, such as an application associated with a particular content platform (e.g. over-the-top (OTT) content platform, content streaming platform, video-on-demand (VOD) platform, etc.). The content consumption behavior related to an application may indicate how much time users have spent consuming (e.g. watching, listening to, reading, viewing, etc.) content via that application over a particular time period. For example, the content consumption behavior related to an application may indicate how many hours or minutes consumers have spent consuming content via that application over the past week, month, or any other time period.

To gain such an understanding, data indicative of content output sessions may be monitored and/or collected. Each content output session may be, for example, a continuous period of time during which content was output. If a content output session is associated with a particular application, that content output session may be, for example, a continuous period of time during which content was output via that application.

However, such content output session data may include outliers. The outliers may include those data points representative of content output sessions that are inorganic. A content output session may be inorganic if, for example, the application responsible for outputting the content was merely running in the background, such as while another application installed on the same device was outputting different content. The outliers may additionally, or alternatively, include those data points representative of content output sessions that are not associated with actual content consumption. For example, this may occur if a user initiated output of the content, but then walked away and left the application running (and outputting the content) for a long period of time (e.g. an implausible period of time, such as a 20-hour period).

Some content output session measurement techniques utilize a simple equation that aims to identify and eliminate the outliers in the content output session data. For example, some content output session measurement techniques may take the mean and standard deviation of the daily content output session duration for all devices, with content output sessions having a duration satisfying the following outlier criteria not being reported as an actual content output session:

$$\text{Duration} > \text{Mean} + 4 \times \text{Std-Dev.}$$

However, this method for identifying and eliminating the outliers in the content output session data has its shortcomings. While this method is simplistic in nature (and therefore easy to use), it potentially censors sessions of binge watching (which are not inorganic sessions). This method also fails to factor in background activity from the device responsible for outputting the content and content output session trends on the application. This method also is not ideal, as the reported data has a high month on month variance.

Accordingly, techniques for more accurately determining content output session outliers are desirable. Disclosed herein is a technique for more accurately determining content output session outliers. Such a technique utilizes three modules: an outlier detection module (ODM), an outlier confirmation module (OCM1), and an outlier censoring module (OCM2). Each of these modules work-with-each-other as part of an overall decision support system for identifying, confirming, and attenuating the influence of outliers in meter data collecting passive internet activities and/or browsing. The OPM and OCM1 are used to detect and confirm outliers, respectively, before the OCM2 is used to censor outliers. This technique is an improvement over previous outlier identification techniques for a number of reasons, including the fact that this technique is less likely to censors sessions of binge watching, and is able to factor in background activity from the device responsible for outputting the content as well as content output session trends on applications.

FIG. 1 illustrates an example hardware and network configuration in which the systems and methods described herein may be implemented. Such a hardware and network configuration 100 includes an analysis network 15, a content provider 50, at least one client device 18, and at least one electronic storage/database 22. The analysis network 15, the content provider 50, the at least one client device 18 are in communication via a network 70.

The analysis network 15 may include third-party servers seeking to receive information related to content output via the at least one client device 18. The analysis network 15 may be configured to receive results of and/or initiate one or more analyses of data received from or about the at least one client device 18. For example, the analysis network 15 may be configured to initiate one or more analyses of content output session data received from or about the at least one client device 18.

The analysis network 15 may include at least one processor 20. The at least one processor 20 may be in communication with the at least one database 22. The at least one processor 20 may receive data stored in the at least one database 22. The at least one database 22 may store a variety of different data. For example, the at least one database 22 may store content output session data and/or device data received from an internet traffic monitoring and/or device identification system, such as the example internet traffic monitoring and/or device identification system described in more detail below with regards to FIGS. 2-3.

Content output session data may be indicative of a plurality of content output sessions, such as via a single application (over-the-top (OTT) content platform, content streaming platform, video-on-demand (VOD) platform, etc.). Each content output session may be, for example, a continuous period of time during which content was output. If the content output session data is associated with a particular application, each content output session may be, for example, a continuous period of time during which content was output via that application. The content output session data may indicate a content identifier and/or a duration of each of the plurality of content output sessions. For example, the content identifier may include at least one of a channel identifier, an application identifier, or a content title. As another example, the duration of each content output session of the plurality of content output sessions may include at least one of a total time of content output for each session or a start time and an end time for each session. The content output session data may additionally, or alternatively, indicate a particular device (e.g. client device 18) responsible for the content output during each session.

The at least one database 22 may additionally, or alternatively, store device data. The device data may indicate, for each of a plurality of different devices (e.g. client device 18), historic content output session data associated with that device. The historic content output session data associated with the device may be indicative of content output sessions across a plurality of different applications (e.g. not just a single application). For example, the device data may include historic content output session data for each device that is associated with at least one content output session associated with the content output session data stored in the at least one database 22.

The processor 20 may be configured to process and/or analyze data stored in the at least one database 22. The processor 20 may include a variety of different components configured to process and/or analyze data. For example, the processor may include an outlier prediction component 30, an outlier confirmation component 32, and/or an outlier censoring component 34. One or more of these components 30, 32, 34 may be used to process and/or analyze data stored in the at least one database 22 in a manner that facilitates the identification, the confirmation, and/or the attenuation of outliers in content output session data. As mentioned above, the content session output data may be received by the at least one database 22 from an internet traffic monitoring and/or device identification system, such as the example internet traffic monitoring and/or device identification system described in more detail below with regards to FIGS. 2-3.

In an embodiment, the processor 20 includes the outlier prediction component 30. The outlier prediction component 30 receives, as input, content output session data. For example, the outlier prediction component 30 may retrieve, from the at least one database 22, content output session data associated with a first time period (e.g. a particular month, week, etc.). The outlier prediction component 30 may predict outliers in the content output session data based on a distribution of the content output session data. The outlier prediction component 30 may predict outliers in the content output session data based on a distribution of the content output session data by classifying each content output session as either an inlier session or an outlier session.

In an embodiment, the outlier prediction component 30 utilizes a machine learning algorithm to classify each content output session as either an inlier session or an outlier session. The machine learning algorithm may be, for example, the Insolation Forest algorithm, the Density-based spatial clustering of applications with noise (DB SCAN) algorithm, a BoxPlot algorithm, k-nearest neighbors algorithm (k-NN), a histogram based algorithm, an angle based algorithm, a local co-relation integral algorithm, any other type of anomaly or outlier detection algorithm, or a combination thereof.

Isolation Forest is an anomaly detection algorithm that identifies anomalies (e.g. outliers) using isolation. At the basis of the Isolation Forest algorithm, there is the tendency of anomalous instances in a dataset to be easier to separate from the rest of the sample (isolate), compared to normal points. In order to isolate a data point, the algorithm recursively generates partitions on the sample by randomly selecting an attribute and then randomly selecting a split value for the attribute, between the minimum and maximum values allowed for that attribute.

The outlier prediction component 30 may determine that a top percentage (e.g. top 30%, or any other predetermined percentage) of the anomaly scores for each application and/or device as potentially being outliers. For example, the content output sessions that belong to this top percentage may be those content output sessions that satisfy (e.g.

exceed) a duration threshold associated with the first time period. The duration threshold may be an amount of time, such as a particular number of hours and/or minutes, above which an organic content output session is unlikely. For example, the top percentage may be those content output sessions having a duration exceeding 8 hours (or any other amount of time), as it is unlikely that a content output session exceeding 8 hours is organic. The content output sessions that belong to this top percentage are herein referred to as the first subset of content output sessions. The content output sessions that do not belong to this top percentage are determined to be inliers, and do not belong to the first subset. An exemplary graph displaying output from the outlier prediction component 30 is discussed below in more detail with regard to FIG. 4.

However, merely relying on the distribution of the content output session data to predict outliers may not be sufficient. The behavior of the device (e.g. client device 18) responsible for outputting the content for each content output session may additionally, or alternatively, be indicative of outliers in the content output session data. For example, if a particular device has often been associated with outlier behavior in the past, this may be a good indicator that a content output session associated with that device that is currently being analyzed is more likely to be an outlier. As another example, if a particular device has rarely been associated with outlier behavior in the past, this may be a good indicator that a content output session associated with that device that is currently being analyzed is less likely to be an outlier—instead, a content output session that appear to be an outlier may actually be an organic, binge-watching content output session.

In an embodiment, the processor 20 includes the outlier confirmation component 32. The outlier confirmation component 32 receives, as input, device data associated with content output sessions, such as the content output sessions belonging to the first subset. For example, the outlier confirmation component 32 may retrieve, from the at least one database 22, device data associated with content output sessions, such as the content output sessions belonging to the first subset. The outlier confirmation component 32 may additionally receive, as input, the content session data associated with the content output sessions belonging to the first subset. The outlier confirmation component 32 may determine outliers based on device behavior. For example, the outlier confirmation component 32 may confirm whether outliers that were already predicted by the outlier prediction component 30 (i.e. those content output sessions belonging to the first subset) are actually outliers, based on the received device data associated with the content output sessions belonging to the first subset. Exemplary device data is discussed in more detail below with regards to FIG. 5.

To confirm whether those content output sessions belonging to the first subset are actually outliers, the outlier confirmation component 32 may classify based on the received device data, each device associated with a content output session belonging to the first subset as an outlier device or an inlier device. Each content output session of the first subset that is associated with a device classified as an outlier device by the outlier confirmation component 32 may be determined to be a confirmed outlier content output session. Collectively, the content output sessions of the first subset that are associated with a device classified as an outlier device by the outlier confirmation component 32 are referred to herein as the second subset of content output sessions.

In an embodiment, classifying each of the devices as an inlier device or an outlier device may be accomplished by determining, for each device, a quantity of days during the first time period associated with at least one outlier session and a total quantity of active days during the first time period. For each device, a ratio of the quantity of days during the first time period associated with at least one outlier session to the quantity of active days during the first time period may be determined. For example, if the first time period is 30-days, a particular device is associated with 20 outlier days during the first time period, and the device was active for 29 days of the 30-day period, the determined ratio for that device is equal to 20/29.

If the determined ratio for a particular device satisfies (e.g. exceeds) a percentage threshold, that device is determined to be an outlier device. Likewise, if the determined ratio for a particular device does not satisfy (e.g. is equal to or below) a percentage threshold, that device is determined to be an inlier device. The percentage threshold may be any predetermined threshold. For example, the percentage threshold may be equal to 30%, 40%, 50%, 60%, or any other percentage. For the example described above, with the device having a determined ratio of 20/29, this particular device may be classified as an outlier device because 20 is more than 50% of 29. Conversely, if a different device has a determined ratio of 10/28, that device may be classified as an inlier device because 10 is less than 50% of 28.

In another embodiment, classifying each of the devices as an inlier device or an outlier device may be accomplished using a technique other than, or in addition to, the ratio technique discussed above. For example, the outlier confirmation component 32 may utilize at least one of a gradient descent algorithm or a time decay algorithm to classify each device as an outlier device or an inlier device. As another example, a certain type of device (e.g. a device associated with a particular manufacturers) may be more likely to be an outlier device than other types of devices. Accordingly, the outlier confirmation component 32 may utilize device type when classifying each device as an outlier device or an inlier device. As yet another example, the outlier confirmation component 32 may weigh more recent content output session data associated with a device more heavily than less recent content output session data associated with that device when classify the device as an outlier device or an inlier device. For example, if the only outlier sessions occurred at or near the beginning of the first time period, the outlier confirmation component 32 may assign a low weight to these outlier sessions—as a result, the device may not be determined to be an outlier device (even if the device would otherwise be considered an outlier device via the ratio method described above).

Once the outlier content output sessions are determined and confirmed, the influence of those outlier sessions on downstream estimates of reach and duration may be attenuated. This may be accomplished by decreasing their duration to an expected duration. In an embodiment, the processor 20 includes the outlier censoring component 34. The outlier censoring component 34 is configured to censor, or cap, the confirmed outlier content output sessions (i.e. those content output sessions belonging to the second subset), such as at a median threshold. For example, the median threshold may be a threshold indicative of session-level duration that may be deemed statistically organic or legitimate in nature, by taking into consideration that legitimate viewership is expected to exhibit variance across time (e.g., months).

By censoring the content output sessions belonging to the second subset, the outlier censoring component 34 helps to stabilize the content output session data. The content output session data may need to be stabilized if, for example, the content output session data associated with the first time period is noticeably different than the content output session data associated with other time periods. For example, the content output session data may need to be stabilized if the content output sessions associated with the first time period are noticeably longer in duration than content output sessions associated with other, earlier time periods.

To censor the content output sessions belonging to the second subset, the outlier censoring component 34 may compare a duration of each content output session of the second subset to a duration threshold associated with a second time period. The second time period may include the first time period and may have a longer duration than the first time period. For example, if the first time period is the month of March 2021, then the second time period may be a two, three, four, five, six (or any number) month period that includes March 2021. The first time period may occur at the end of the second time period. For example, if the first time period is the month of March 2021, the second time period may occur from October 2020-March 2021.

The duration threshold associated with the second time period may be a median duration threshold associated with the second time period. For example, the duration threshold discussed above with regard to the outlier prediction component 30 (e.g. the duration threshold associated with the first time period may be an amount of time, such as a particular number of hours and/or minutes, above which an organic content output session is unlikely) may be determined for each month of the second time period. If the second time period if six months, six different duration thresholds may be determined in the manner discussed above with regard to the outlier prediction component 30. The median of all of these duration thresholds may be determined. The determined median may be the duration threshold associated with the second time period. For example, the duration threshold may be determined by estimating the median of longest running inlier sessions for each month of the second time period (e.g., past 6 months) at (app x platform) level.

The outlier censoring component 34 may determine which (if any) of the content output sessions belonging to the second subset have a duration that exceeds the duration threshold associated with the second time period. The content output sessions belonging to the second subset having a duration that exceeds the duration threshold associated with the second time period are herein referred to the third subset of content output sessions. The outlier censoring component 34 may determine a total quantity of time by which the durations associated with each of the third subset of content output sessions exceeds the duration threshold. The outlier censoring component 34 may adjust a total duration of the content output sessions of the second subset by the determined total quantity of time.

For example, the duration of an output session of the second subset may be ten hours of viewership via a CNN app on a Roku device. To generate the duration threshold, it may be observed that the longest duration of inlier sessions via the CNN app on Roku devices for every month in the second time period (e.g., last six months). The duration threshold may be the estimated median duration of those values. For example, the duration threshold may be 8.5 hours. Accordingly, the confirmed outlier session duration may then be censored (e.g., reduced) by 1.5 hours.

The content provider 50 may distribute content to and/or output content via the at least one client device 18 for consumption. The content may include, for example, a website, video content, and/or audio content. Video content may refer generally to any video content produced for viewer consumption regardless of the type, format, genre, or delivery method. Video content may comprise video content produced for broadcast via over-the-air radio, cable, satellite, or the internet. Video content may comprise digital video content produced for digital video streaming or video-on-demand. Video content may comprise a movie, a television show or program, an episodic or serial television series, or a documentary series, such as a nature documentary series. As yet another example, video content may include a regularly scheduled video program series, such as a nightly news program. Audio content may include podcasts, audio books, songs or music, radio broadcasts, or any other type of content that is consumed primarily by ear.

The at least one client device 18 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The at least one client device 18 may be associated with one or more users.

The processor 20, the at least one database 22, the at least one client device 18, and/or the content provider 50 may each comprise one or more computing devices and/or network devices. The at least one database 22 may comprise a data storage device and/or system, such as a network-attached storage (NAS) system. The processor 20, the at least one database 22, the at least one client device 18, the content provider 50, and/or the network 70 may each be implemented in one or more computing devices, such as the computing device 800 of FIG. 8. The network 70 may comprise one or more public networks (e.g., the Internet) and/or one or more private networks. A private network may include a wireless local area network (WLAN), a local area network (LAN), a wide area network (WAN), a cellular network, or an intranet. The network 70 may comprise wired network(s) and/or wireless network(s).

Figure 2:
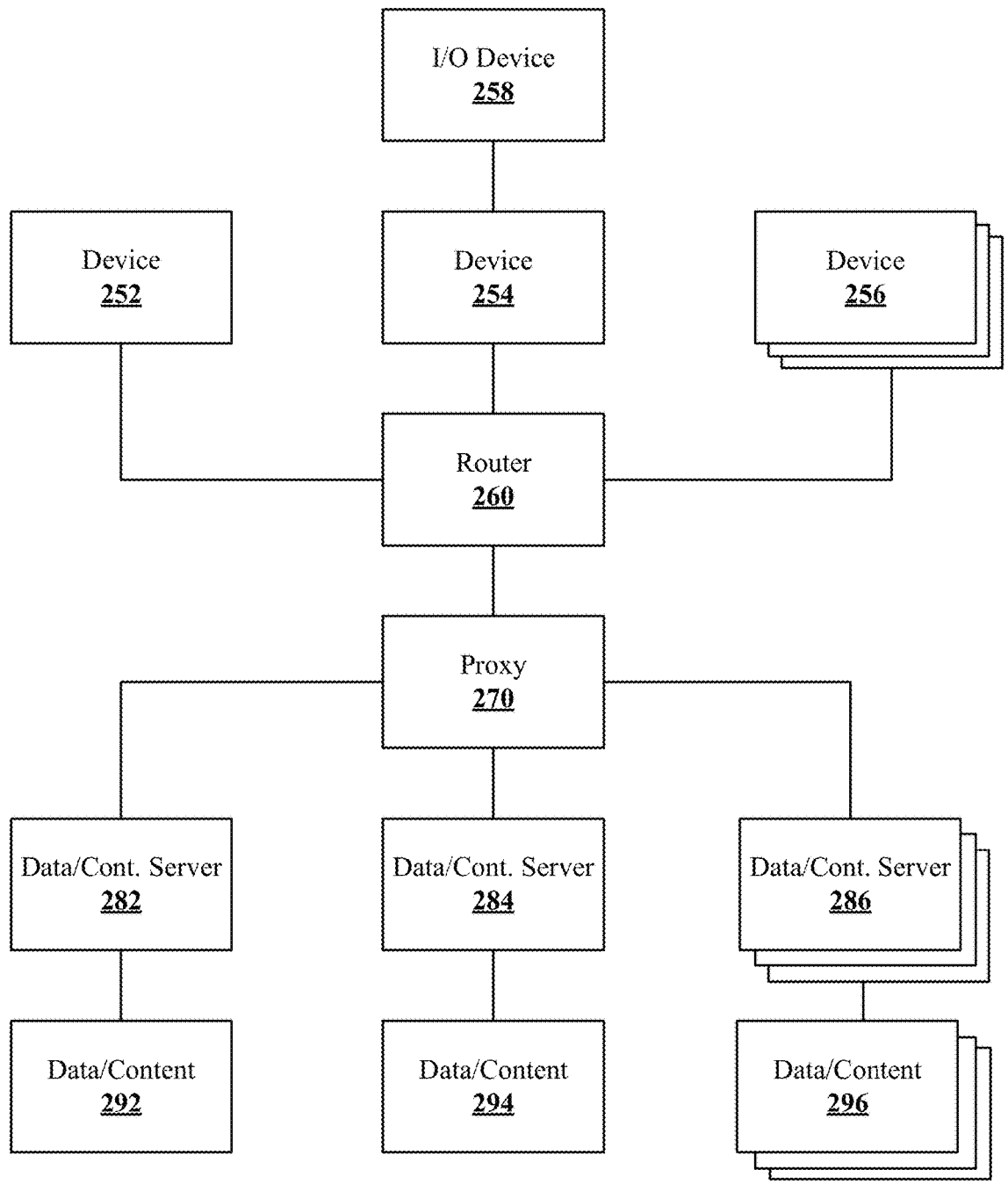
FIG. 2 illustrates an example traffic monitoring and/or device identification system.

FIG. 2 illustrates an example traffic monitoring and/or device identification system 200. As mentioned above with regard to FIG. 1, the traffic monitoring and/or device identification system 200 may send content output session data and/or device data to the at least one database 22 for storage. Once stored in the at least one database 22, the content output session data and/or the device data may be utilized by the analysis network 15 to determine content output session outliers.

A router 260 is established as a routing device for connection between one or more electronic devices 252, 254, 256 (e.g. client device(s) 18). Electronic devices 252, 254, 256 may communicate with proxy servers and data servers via the router 260 to which all of each user of the electronic devices' 252, 254, 256 activity is routed. The electronic devices 252, 254, 256 are connected to the router 260 over a communication channel (wired, wireless, or both). For example, the electronic devices 252, 254, 256 may be connected by an Ethernet cable to the router 260 and/or via Wi-Fi. The router 260 enables all of the activity to be filtered and data to be collected about specific types of activity of specific users, devices, and/or content output sessions and store such data locally and/or on external servers (not shown). The router 260 may be part of a home network or a private network (e.g., a corporate office network). The router 260 is provided in addition to, or is present instead of, a proxy server 270 (e.g., an Internet Service Provider machine).

In an example use case scenario, an intermediary domain is established on the Internet where sessions are maintained by passing data to and from the electronic devices 252, 254, 256, data/content servers 282, 284, 286 with content/data 292, 294, and 296 via the router 260. For example, by simply instructing the user's Internet browser to route all Internet traffic from the user through the router 260, the intermediary domain connected to the router 260 can provide data for collection as desired without incurring perceptible delays. By way of example only and not by way of limitation, the electronic device 254 could be a personal computer (PC) with an input/output device 258 (e.g., keyboard, mouse), the electronic device 252 could be a cellular or a mobile phone (a "Smart Phone" as understood by one of ordinary skill in the art), and the electronic device 256 could be a smart television, television, tablet device or a video gaming console, or the like.

Enrollment in the device identification system 200 by the electronic devices 252, 254, 256 may be voluntary on the part of the individual user, and the enrolled user may be provided some incentive in return for allowing the system 250 to have all of that user's Internet traffic routed through the system's domain. Alternatively, enrollment in the system 200 of specific users and of the electronic devices 252, 254, 256 may be mandatory. For example, specific information about the user could be gathered as a prerequisite for enrollment, which enriches the data collected about that user's network usage habits and permits inter-database comparisons.

Figure 3:
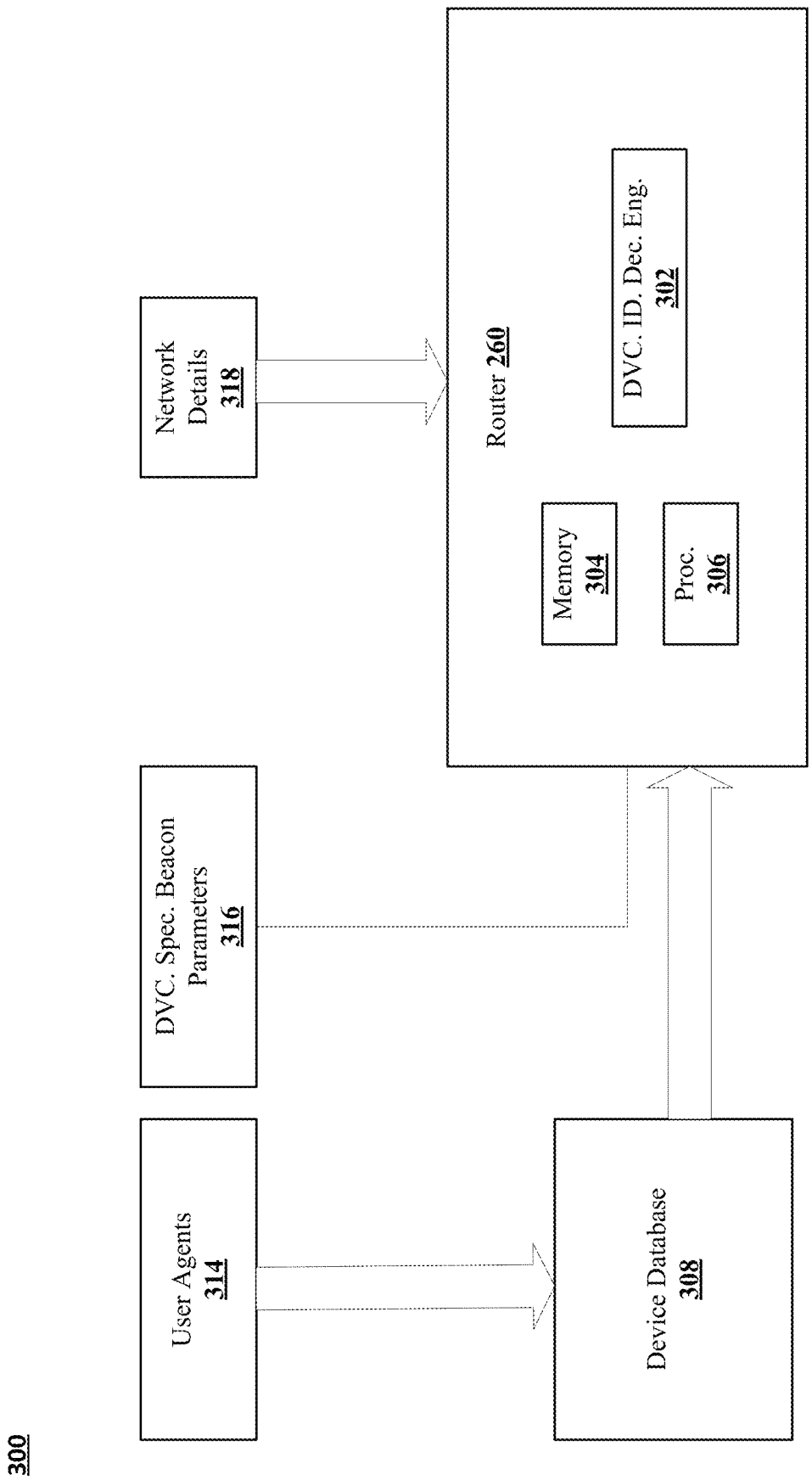
FIG. 3 illustrates a block diagram of details of the example device identification system of FIG. 2.

FIG. 3. illustrates a block diagram 300 of details of the example device identification system of FIG. 2. The router 260 includes a device identification decision engine 302, a memory 304, and a processor 306. The router 260 may include additional hardware components, middleware components, software components, and the like, or combinations thereof. Such components may include, but are not limited to, co-processors, network interface cards, input-output ports, connection status indicators, antennas, display(s), and the like.

In one aspect of this disclosure, the device identification decision engine 302 may be implemented as part of a programmable logic array (PLA) with software executable configuration to assist the processor 306 to carry out the various features and functionalities of this invention. In another aspect, the device identification decision engine 302 may be implemented as instructions written as code executable by the processor 306. Such instructions when executed by the processor 306 cause the processor 306 in the router 260 to carry out a device identification process. Regardless of the physical implementation of the device identification decision engine 302, the device identification decision engine 302 handles data parameters for network sessions, such as content output sessions, through the router 260 that enable the router 260 to output data identifying individual users of the electronic devices 252, 254, 256 for each network session active on the router 260.

Each electronic device 252, 254, 256 may include user agents 314 installed thereupon. The user agents 314 may identify, among other things, a type of each of the electronic device 252, 254, 256 (e.g., based on an operating system type). The user agents 314 may be installed individually on each of the electronic devices 252, 254, 256 as a software application or applet. The user agents 314 may begin executing automatically every time each of the electronic devices 252, 254, 256 may start, and/or every time a new network session, such as a content output session, is established by the electronic devices 252, 254, 256. For example, for a desktop computer or a laptop, the user agent may identify whether the operating system is Windows® from Microsoft Corporation of Redmond, Wash. or MacOS® from Apple, Inc. of Cupertino, Calif.

The router 260 may carry out a look up of the device database 308. The device database 308 may provide matching information corresponding to the electronic device 252, 254, 256. Based upon the information received from the device database 308, the router 260 may use the device identification decision engine 302 to compare device information to information stored in the device database 308 and come to an identification of the device with respect to a make and model information of the electronic devices 252, 254, 256. The make and model information may include detailed hardware, operating system, and software specifications of the electronic devices 252, 254, 256, although the router 260 may be programmable to select a level of detail with respect to the make and model information of the electronic devices 252, 254, 256

The router 260 is configured to collect data about user habits, preferences, uses, and the like and carry out a device identification method to identify specific users of each session initiated by the electronic devices 252, 254, 256 using this data. Data representative of users' individual identity (rather than only that of the electronic devices' 252, 254, 256), the consumer's behavior, including (but not exclusively) what choices the user makes, why particular characteristics of a product or service are important, what products or services a consumer has considered and decides not to purchase, and how much money a consumer (user) is willing to pay and has paid for a product or service, can be a valuable product in itself. The quality of the data, e.g., statistical significance and error, greatly impacts how valuable the data is to a party wanting to know about a particular consumer's habits. The user agents 314 may provide these metrics to the router 260.

The router 260 may receive device specific beacon parameters 316 from one or more of the electronic devices 252, 254, 256. For example, when the electronic device 252 is a mobile phone, the router 260 may know if the mobile phone towers have changed with the users. A first user of the electronic device 252 may use the electronic device 252 inside a home where the router 260 is placed. The router 260 will know a corresponding nearest cellular tower for the home. The electronic device 256 may then be taken to a location (e.g., a school) and this may result in a change of the cellular tower registered at the electronic device 256. When the electronic device 256 returns to the home, the router 260 may obtain this changed cellular tower information to gain insight as to who a user of the electronic device 256 might be (e.g., a child) during the period that cellular phone tower was communicating with the electronic device 256. As will be understood by one of ordinary skill in the art, the mobile phone is usually within a range of at least three cellular phone towers so that triangulation techniques may be utilized to pinpoint the location of the mobile phone at a desired granularity.

The router 260 may obtain basic network details 318 associated with each of the electronic devices 252, 254, 256. Such network details may include obtaining host name(s), Medium Access Control (MAC) address(es), Internet Protocol (IP) address(es) of the electronic devices 252, 254, 256 having network sessions via the router 260. The host name may include a device name of the electronic devices 252, 254, 256. The MAC and IP addresses may then be used along with the host name to cross-check and validate the specific users for each session of the electronic devices 252, 254, 256.

The traffic monitoring and/or device identification system 200 may collect and generate data which is extremely complete for an individual user on a session by session basis at the level of the router 206, and therefore can be very useful by itself or when correlated with other data about that user, or other consumers that share characteristics with the user. Furthermore, in implementations of the traffic monitoring and/or device identification system 200 do not rely on client-side data collection, but instead utilize collection of data at the router 260, the impact on the performance of the individual consumer's electronic devices 252, 254, 256 is minimal, and does not require repeated software updating as with prior systems which were resident on the electronic devices 252, 254, 256.

Figure 4:
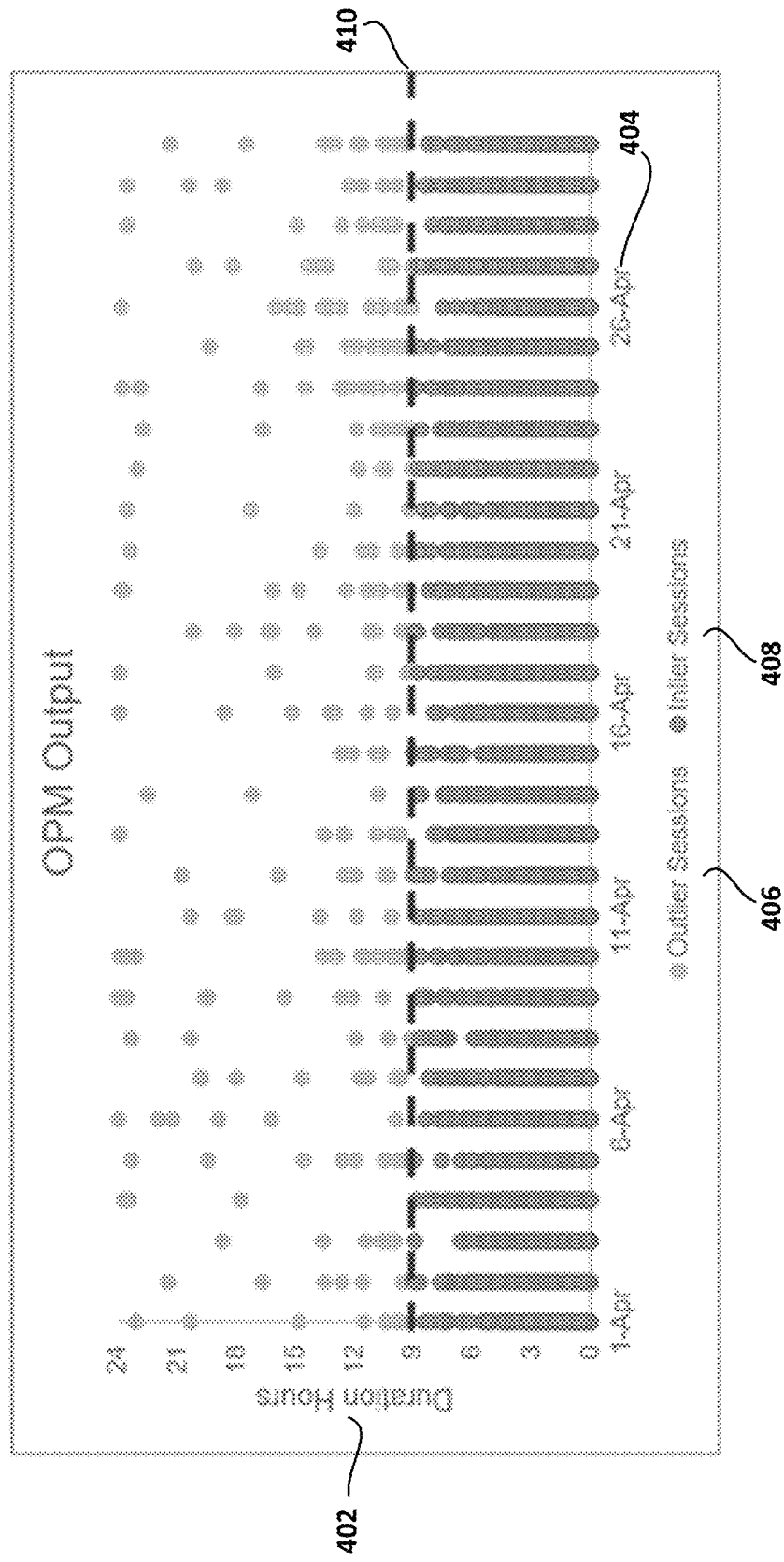
FIG. 4 illustrates an example of a graph displaying data indicative of content output session sessions.

FIG. 4 illustrates an example of a graph 400 displaying data indicative of content output sessions. The graph 400 displays output from the outlier prediction component 30 discussed above with regard to FIG. 1. As discussed above, the outlier prediction component 30 may receive, as input, content output session data. The input content output session data may be associated with a particular time period (e.g. the first time period) and/or with a particular type of device and/or a particular application. The outlier prediction component 30 may predict outliers in the content output session data based on a distribution of the content output session data. For example, the outlier prediction component 30 may predict outliers in the content output session data based on a distribution of the content output session data by classifying each content output session as either an inlier session or an outlier session. To classify the content output sessions, the outlier prediction component 30 may utilize an anomaly detection algorithm, such as the Isolation Forest algorithm, to identify anomalies (e.g. outliers) in the input content output session data set using isolation.

The graph 400 displays duration of content output session on the vertical axis 402 and date/time of content output session on the horizontal axis 404. Each data point on the graph 400 represents a content output session. The outlier prediction component 30 may determine (e.g. predict) that some of the content output sessions represented by the input data are outlier sessions 406, whereas others are inlier sessions 408. To determine which content output sessions are outlier sessions 406 and which are inlier sessions 408, the outlier prediction component 30 may determine a top percentage (e.g. top 30%, or any other predetermined percentage) of the anomaly scores for each application and/or device as potentially being outliers.

For example, the content output sessions that belong to this top percentage may be those content output sessions that satisfy (e.g. exceed) a duration threshold associated with the first time period. The duration threshold is represented by the line 410 in the graph 400. The duration threshold may be an amount of time, such as a particular number of hours and/or minutes, above which an organic content output session is unlikely. For example, the line 410 is at a duration time equal to 8.99 hours in the graph 400. Accordingly, the top percentage may be those content output sessions having a duration exceeding 8.99 hours, as it is unlikely that a content output session exceeding 8 hours is organic. The content output sessions that belong to this top percentage (e.g. the data points above the line 410) are determined to be outliers. The content output sessions that do not belong to this top percentage (e.g. the data points below the line 410) are determined to be inliers, and do not belong to the first subset. An exemplary graph.

FIG. 5 illustrates an example of a chart 500 displaying data indicative of device behavior. As discussed above, the outlier confirmation component 32 receives, as input, device data associated with content output sessions, such as the content output sessions belonging to the first subset. The outlier confirmation component 32 may additionally receive, as input, the content session data associated with the content output sessions belonging to the first subset. The outlier confirmation component 32 may determine outliers based on device behavior. For example, the outlier confirmation component 32 may confirm those content output sessions belonging to the first subset, such as the content sessions represented by the data points above the line 410 in FIG. 4) are actually outliers, based on whether those content sessions are associated with an outlier device or an inlier device.

The chart 500 depicts device data associated with a single device across a plurality of different content output applications during a first time period. The first row of the chart 500 is associated with the device's behavior for a first application 502a and the second row of the chart is associated with the device's behavior for a second application 502b.

The chart 500 depicts, for both the application 502a and the application 502b, a total inlier duration 504a during the first time period. The total inlier duration 504a is the total duration (e.g. total hours) of inlier content output sessions associated with the device during the first time period. For example, the total duration (e.g. total hours) of inlier content output sessions via the first application 502a during the first time period is 115 hours. Likewise, the chart 500 depicts, for both the application 502a and the application 502b, a total outlier duration 504b during the first time period. The total outlier duration 504b is the total duration (e.g. total hours) of outlier content output sessions associated with the device during the first time period. For example, the total duration (e.g. total hours) of outlier content output sessions via the first application 502a during the first time period is no hours, whereas the total duration (e.g. total hours) of outlier content output sessions via the second application 502b during the first time period is 430 hours. The chart 500 depicts, for both the application 502a and the application 502b, a total active duration 506 during the first time period. The total active duration 506 for each application is equal to the sum of the total inlier duration 504a and the total outlier duration 504b for that application. The total active duration 506 for each application may be summed together to get a final active duration associated with the device.

In an embodiment, to determine whether the device is an outlier device or an inlier device, a ratio of the total outlier duration (summed together for all applications) to the total active duration of the device may be determined. For example, the ratio for the device represented by the chart 500 is equal to 430/(115+517)=430/632. If the determined ratio satisfies (e.g. exceeds) a percentage threshold, that device is determined to be an outlier device. Likewise, if the determined ratio for a particular device does not satisfy (e.g. is equal to or below) a percentage threshold, that device is determined to be an inlier device. The percentage threshold may be any predetermined threshold. For example, the percentage threshold may be equal to 30%, 40%, 50%, 60%, or any other percentage. For the example described above, with the device having a determined ratio of 430/632, this particular device may be classified as an outlier device because the ratio is equal to more than 50%. Because the device is classified as an outlier device, a content output session belonging to the first subset that is associated with this device may be a confirmed outlier (e.g., may belong to the second subset of content output sessions).

Figures 6A, 6B:
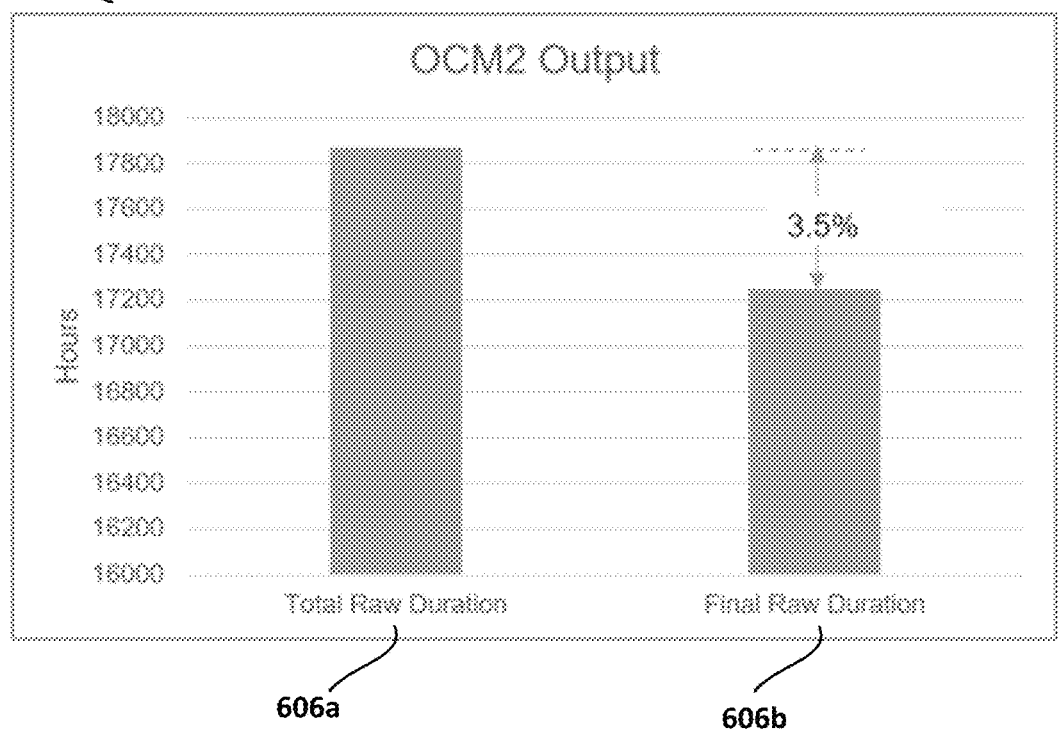
FIG. 6A illustrates an example of a chart displaying a sample of data indicative of duration thresholds over a period of time.
FIG. 6B illustrates an example of a bar graph displaying censorship of outlier content output session data.

FIG. 6A illustrates an example of a chart 602 displaying a sample of data indicative of duration thresholds over a period of time. As discussed above, the outlier censoring component 34 is configured to censor, or cap, the confirmed outlier content output sessions (i.e. those content output sessions belonging to the second subset), such as at a median duration threshold. By censoring the content output sessions belonging to the second subset, the outlier censoring component 34 helps to stabilize the content output session data. The content output session data may need to be stabilized if, for example, the content output session data associated with the first time period is noticeably different than the content output session data associated with other time periods. For example, the content output session data may need to be stabilized if the content output sessions associated with the first time period are noticeably longer in duration than content output sessions associated with other, earlier time periods.

The data displayed in the chart 602 may be utilized, the outlier censoring component 34, to determine the median duration threshold. The chart 602 includes a duration threshold associated with six months (November-April) of a particular year. For example, the chart 602 indicates the duration threshold associated with the month of November is 10.99 hours. Similarly, the chart 602 indicates the duration threshold associated with the month of December is 10.98 hours, and so on for the remaining months. The final column in the chart 602 indicates a median threshold, such as the median duration threshold that may be utilized by the outlier censoring component 34 to censor, or cap, the content output sessions belonging to the second subset. The median threshold may be generated by determining the median value of the duration threshold values over the six-month period of November-April. In the chart 602, the median threshold is 8.99 hours.

As also discussed above, to censor the content output sessions belonging to the second subset, the outlier censoring component 34 may compare a duration of each content output session of the second subset to the median duration threshold. FIG. 6B illustrates an example of a bar graph 604 displaying censorship of outlier content output session data. For example, the bar graph 604 displays censorship of the second subset of content output sessions based on the determined median duration threshold (for example, 8.99 hours in regard to the chart 602 of FIG. 6A).

The outlier censoring component 34 may determine which (if any) of the content output sessions belonging to the second subset have a duration that exceeds the median duration threshold. The content output sessions belonging to the second subset having a duration that exceeds the median duration threshold are herein referred to the third subset of content output sessions. The outlier censoring component 34 may determine a total quantity of time by which the durations associated with each of the third subset of content output sessions exceeds the median duration threshold.

The outlier censoring component 34 may adjust a total duration of the content output sessions of the second subset by the determined total quantity of time. The first bar 606a in the bar graph 602 is representative of the total raw duration of the content output sessions of the second subset. For example, the first bar 606a indicates that the total raw duration of the content output sessions of the second subset is around 17900 hours. The second bar 606b in the bar graph 602 is representative of the final raw duration (after adjustment) of the content output sessions of the second subset. For example, the second bar 606b indicates that the final raw duration of the content output sessions of the second subset is around 17200 hours. The adjustment made to the total raw duration resulting in a 3.5% decrease in the total duration associated with the content output sessions belonging to the second subset.

Figure 7:
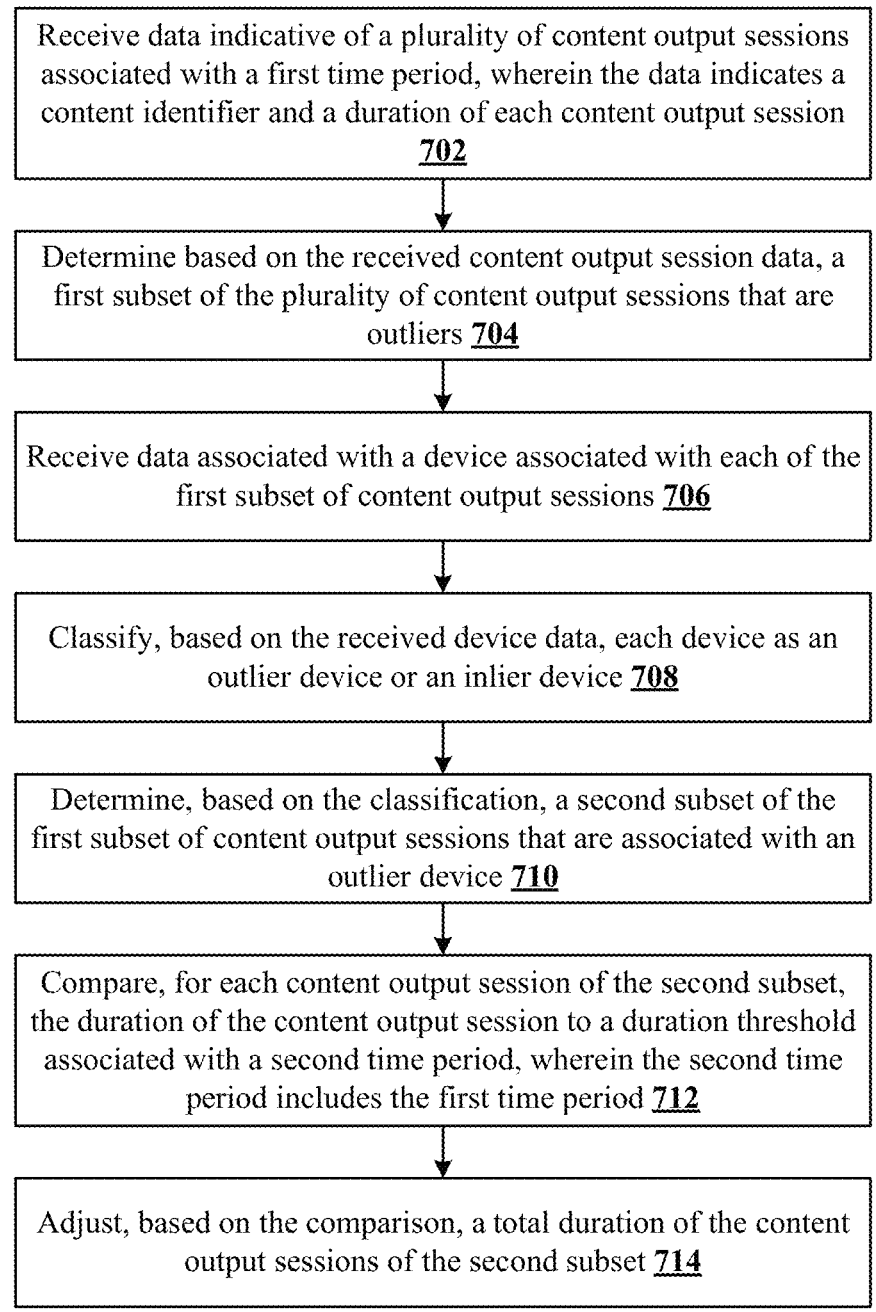
FIG. 7 illustrates an example method for determining content output session outliers.

As discussed above, it may be desirable to have a more accurate technique for determining content output session outliers. FIG. 7 illustrates such an example method 700 for determining content output session outliers. The method 700 may determine content output session outliers in a manner that is less likely to censors sessions of binge watching than current techniques. The method 700 is also and is able to factor in background activity from the device responsible for outputting the content, as well as content output session trends on applications. The method 700 may be performed, for example, by the processor 20 of FIG. 1.

Content output session data may be stored in a database (e.g. database 22). At 702, data indicative of a plurality of content output sessions associated with a first time period may be received. For example, the data indicative of the plurality of content output sessions associated with the first time period (e.g. a particular week, month, year, etc.) may be retrieved from the database. The data indicative of the plurality of content output sessions may be received by the database from an internet traffic monitoring and/or device identification system, such as the example internet traffic monitoring and/or device identification system described above with regards to FIGS. 2-3.

The data indicative of the plurality of content output sessions may be indicative of a plurality of content output sessions via a single application (over-the-top (OTT) content platform, content streaming platform, video-on-demand (VOD) platform, etc.). Each content output session may be, for example, a continuous period of time during which content was output. If the content output session data is associated with a particular application, each content output session may be, for example, a continuous period of time during which content was output via that application. The data indicative of the plurality of content output sessions may indicate a content identifier and/or a duration of each of the plurality of content output sessions. For example, the content identifier may include at least one of a channel identifier, an application identifier, or a content title. As another example, the duration of each content output session of the plurality of content output sessions may include at least one of a total time of content output for each session or a start time and an end time for each session. The data indicative of the plurality of content output sessions may additionally, or alternatively, indicate a particular device (e.g. client device 18) responsible for the content output during each session.

The received content output session data may be utilized to predict one or more outliers in the content output session data. At 704, a first subset of the plurality of content output sessions that are outliers may be determined. The first subset of the plurality of content output sessions that are outliers may be determined based on a distribution of the content output session data. For example, outliers in the content output session data may be determined based on a distribution of the content output session data by classifying each content output session as either an inlier session or an outlier session.

In an embodiment, a machine learning algorithm may be utilized to classify each content output session as either an inlier session or an outlier session. As discussed above, the machine learning algorithm may be, for example, the Insolation Forest algorithm, the Density-based spatial clustering of applications with noise (DBSCAN) algorithm, a BoxPlot algorithm, a k-nearest neighbors algorithm (k-NN), a histogram based algorithm, an angle based algorithm, a local co-relation integral algorithm, any other type of anomaly or outlier detection algorithm, or a combination thereof.

The machine learning algorithm may be utilized to determine a top percentage (e.g. top 30%, or any other predetermined percentage) of the anomaly scores for each application and/or device as potentially being outliers. For example, the content output sessions that belong to this top percentage may be those content output sessions that satisfy (e.g. exceed) a duration threshold associated with the first time period. The duration threshold may be an amount of time, such as a particular number of hours and/or minutes, above which an organic content output session is unlikely. For example, the top percentage may be those content output sessions having a duration exceeding 8 hours (or any other amount of time), as it is unlikely that a content output session exceeding 8 hours is organic. The content output sessions that belong to this top percentage may be the content output sessions belonging to the first subset of content output sessions. The content output sessions that do not belong to this top percentage are determined to be inliers, and do not belong to the first subset.

However, merely relying on the distribution of the content output session data to predict outliers may not be sufficient. The behavior of the device (e.g. client device 18) responsible for outputting the content for each content output session may additionally, or alternatively, be indicative of outliers in the content output session data. For example, if a particular device has often been associated with outlier behavior in the past, this may be a good indicator that a content output session associated with that device that is currently being analyzed is more likely to be an outlier. As another example, if a particular device has rarely been associated with outlier behavior in the past, this may be a good indicator that a content output session associated with that device that is currently being analyzed is less likely to be an outlier—instead, a content output session that appear to be an outlier may actually be an organic, binge-watching content output session.

A database (e.g. database 22) may store device data. The device data may indicate, for each of a plurality of different devices (e.g. client device 18), historic content output session data associated with that device. The historic content output session data associated with the device may be indicative of content output sessions across a plurality of different applications (e.g. not just a single application). For example, the device data may include historic content output session data for each device that is associated with at least one content output session belonging to the first subset. At 706, data associated with a device associated with each of the first subset of content output sessions may be received. For example, the device data may be retrieved from the database. The device data be received by the database from an internet traffic monitoring and/or device identification system, such as the example internet traffic monitoring and/or device identification system described above with regards to FIGS. 2-3.

The device data may be utilized to confirm whether the content output sessions belonging to the first subset are actually outliers, or if they should instead be classified as inliers. At 708, each device may be classified as an outlier device or an inlier device based on the received device data. Each content output session of the first subset that is associated with a device classified as an outlier device may be determined to be a confirmed outlier content output session.

In an embodiment, classifying each of the devices as an inlier device or an outlier device may be accomplished by determining, for each device, a quantity of days during the first time period associated with at least one outlier session and a total quantity of active days during the first time period. For each device, a ratio of the quantity of days during the first time period associated with at least one outlier session to the quantity of active days during the first time period may be determined. If the determined ratio for a particular device satisfies (e.g. exceeds) a percentage threshold, that device is determined to be an outlier device. Likewise, if the determined ratio for a particular device does not satisfy (e.g. is equal to or below) a percentage threshold, that device is determined to be an inlier device.

In another embodiment, classifying each of the devices as an inlier device or an outlier device may be accomplished using a technique other than, or in addition to, the ratio technique discussed above. For example, at least one of a gradient descent algorithm or a time decay algorithm may be utilized to classify each device as an outlier device or an inlier device. As another example, a certain type of device (e.g. a device associated with a particular manufacturers) may be more likely to be an outlier device than other types of devices. Accordingly, device type may be utilized when classifying each device as an outlier device or an inlier device. As yet another example, recent content output session data associated with a device may be weighted more heavily than less recent content output session data associated with that device when classifying the device as an outlier device or an inlier device. For example, if the only outlier sessions occurred at or near the beginning of the first time period, a low weight may be assigned to these outlier sessions—as a result, the device may not be determined to be an outlier device (even if the device would otherwise be considered an outlier device via the ratio method described above).

Collectively, the content output sessions of the first subset that are associated with a device classified as an outlier device belong to a second subset of content output sessions. At 710, the second subset of the first subset of content output sessions that are associated with an outlier device may be determined based on the device classification.

The content output session data associated with the second subset of content output sessions may need to be stabilized if, for example, the content output session data associated with the first time period is noticeably different than the content output session data associated with other time periods. For example, the content output session data associated with the second subset of content output sessions may need to be stabilized if the content output sessions associated with the first time period are noticeably longer in duration than content output sessions associated with other, earlier time periods. The content output session data associated with the second subset of content output sessions may be compared with earlier time periods to determine whether overall viewership merely increased, or if content output sessions of the second subset are actually outliers To censor the content output sessions belonging to the second subset, a duration of each content output session of the second subset may be compared to a duration threshold. At 712, a duration of each content output session of the second subset may be compared to a duration threshold associated with a second time period. The second time period may include the first time period and may have a longer duration than the first time period. For example, if the first time period is the month of March 2021, then the second time period may be a two, three, four, five, six (or any number) month period that includes March 2021. The first time period may occur at the end of the second time period. For example, if the first time period is the month of March 2021, the second time period may occur from October 2020-March 2021.

The duration threshold associated with the second time period may be a median duration threshold associated with the second time period. For example, the duration threshold discussed above with regard to the outlier prediction component 30 of FIG. 1 may be determined for each month of the second time period. If the second time period if six months, six different duration thresholds may be determined in the manner discussed above with regard to the outlier prediction component 30. The median of all of these duration thresholds may be determined. The determined median may be the duration threshold associated with the second time period.

It may be determined which (if any) of the content output sessions belonging to the second subset have a duration that exceeds the duration threshold associated with the second time period. The content output sessions belonging to the second subset having a duration that exceeds the duration threshold associated with the second time period are herein referred to the third subset of content output sessions. A total quantity of time by which the durations associated with each of the third subset of content output sessions exceeds the duration threshold may be determined. At 714, a total duration of the content output sessions of the second subset may be adjusted by the determined total quantity of time. For example, a total duration of the content output sessions of the second subset may be reduced by the determined total quantity of time.

Figure 8:
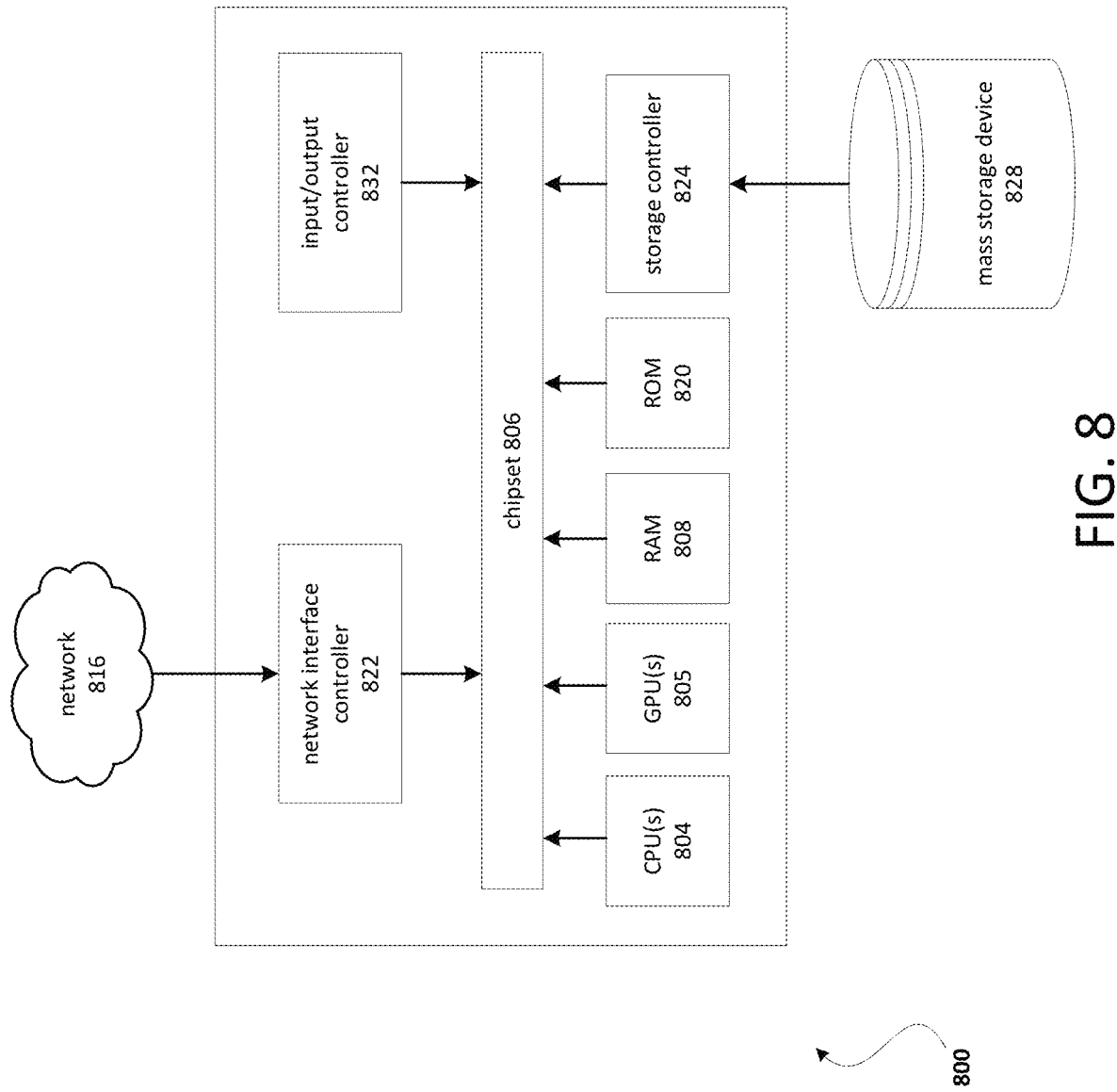
FIG. 8 illustrates a block diagram of an example computing device.

FIG. 8 depicts a computing device that may be used in various aspects. With regard to the example environment of FIG. 1, one or more of the processor(s) 20, the database 22, client devices(s) 18, and/or the content provider 50, and/or network 70 may be implemented in an instance of a computing device 800 of FIG. 8. The computer architecture shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement the methods described in FIG. 7.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s) 805. The GPU(s) 805 may comprise processing units specialized for but not necessarily limited to highly parallel computations, such as graphics and other visualization-related processing.

A user interface may be provided between the CPU(s) 804 and the remainder of the components and devices on the baseboard. The interface may be used to access a random access memory (RAM) 808 used as the main memory in the computing device 800. The interface may be used to access a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein. The user interface may be provided by a one or more electrical components such as the chipset 806.

The computing device 800 may operate in a networked environment using logical connections to remote computing nodes and computer systems through local area network (LAN) 816. The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a storage device 828 that provides non-volatile storage for the computer. The storage device 828 may store system programs, application programs, other program modules, and data, which have been described in greater detail herein. The storage device 828 may be connected to the computing device 800 through a storage controller 824 connected to the chipset 806. The storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 828 is characterized as primary or secondary storage and the like.

For example, the computing device 800 may store information to the storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may read information from the storage device 828 by detecting the physical states or characteristics of one or more particular locations within the physical storage units.

In addition or alternatively to the storage device 828 described herein, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The storage device 828 may store other system or application programs and data utilized by the computing device 800.

The storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described herein. The computing device 800 may have access to computer-readable storage media storing computer-executable instructions, which, when executed by the computing device 800, may perform the methods described in relation to FIG. 7.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

One skilled in the art will appreciate that the systems and methods disclosed herein may be implemented via a computing device that may comprise, but are not limited to, one or more processors, a system memory, and a system bus that couples various system components including the processor to the system memory. In the case of multiple processors, the system may utilize parallel computing.

For purposes of illustration, application programs and other executable program components such as the operating system are illustrated herein as discrete blocks, although it is recognized that such programs and components reside at various times in different storage components of the computing device, and are executed by the data processor(s) of the computer. An implementation of service software may be stored on or transmitted across some form of computer-readable media. Any of the disclosed methods may be performed by computer-readable instructions embodied on computer-readable media. Computer-readable media may be any available media that may be accessed by a computer. By way of example and not meant to be limiting, computer-readable media may comprise "computer storage media" and "communications media." "Computer storage media" comprise volatile and non-volatile, removable and non-removable media implemented in any methods or technology for storage of information such as computer-readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer. Application programs and the like and/or storage media may be implemented, at least in part, at a remote system.

As used in the specification and the appended claims, the singular forms "a," "an" and "the" include plural referents unless the context clearly dictates otherwise. Ranges may be expressed herein as from "about" one particular value, and/or to "about" another particular value. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
receiving data indicative of a plurality of content output sessions associated with a first time period, wherein the data indicates a content identifier, a device identifier, and a duration for each content output session;
determining, based on the received data, a first subset of the plurality of content output sessions that are outlier sessions;
determining, based on the first subset of the plurality of content output sessions that are outlier sessions, a quantity of times during the first time period that each device identifier is associated with an outlier session;
classifying, based on the quantity of times during the first time period that each device identifier is associated with an outlier session, each device as an outlier device or an inlier device;
determining, based on the classification, a second subset of the first subset of content output sessions that are associated with an outlier device;
comparing, for each content output session of the second subset, the duration of the content output session to a duration threshold associated with a second time period; and
adjusting, based on the comparison, a total duration of the content output sessions of the second subset.

2. The method of claim 1, wherein receiving the data indicative of the plurality of content output sessions associated with the first time period comprises:
retrieving, from a database, data indicative of sessions during which content was output during the first time period.

3. The method of claim 1, wherein determining the first subset of the plurality of content output sessions that are outlier sessions is based on a distribution of the received data.

4. The method of claim 1, wherein determining, based on the received data, the first subset of the plurality of content output sessions that are outlier sessions comprises:
determining that the first subset of the plurality of content output sessions that are outlier sessions satisfy a duration threshold associated with the first time period.

5. The method of claim 4, wherein determining that the first subset of the plurality of content output sessions satisfy the duration threshold associated with the first time period comprises:
determining that each content output session of the first subset has a duration that exceeds the duration threshold associated with the first time period.

6. The method of claim 1, wherein determining the quantity of times during the first time period that each device identifier is associated with the outlier session comprises:
determining a quantity of days during the first time period that each device identifier is associated with at least one outlier session and a quantity of active days during the first time period for each device identifier.

7. The method of claim 6, wherein classifying-each device as an outlier device or an inlier device comprises:
determining, for each device, a ratio of the quantity of days during the first time period that each device identifier is associated with at least one outlier session to the quantity of active days during the first time period for each device identifier.

8. The method of claim 7, wherein classifying each device as an outlier device or an inlier device comprises classifying-a device as an outlier device if the ratio associated with that device exceeds an outlier threshold.

9. The method of claim 7, wherein classifying each device as an outlier device or an inlier device comprises classifying a device as an inlier device if the ratio associated with that device does not exceeds an outlier threshold.

10. The method of claim 1, wherein the second time period has a duration that is longer than a duration of the first time period.

11. The method of claim 10, wherein the duration threshold associated with the second time period is indicative of a median duration during which content that is output during the second time period.

12. The method of claim 1, wherein adjusting the total duration of the content output sessions of the second subset comprises:
determining, based on the comparison, a third subset of the second subset of content output sessions associated with a duration exceeding the duration threshold.

13. The method of claim 12, wherein adjusting the total duration of the content output sessions of the second subset further comprises:
determining a total quantity of time by which the durations associated with each of the third subset of content output sessions exceed the duration threshold.

14. The method of claim 13, wherein adjusting the total duration of the content output sessions of the second subset further comprises:
reducing the total duration associated with the content output sessions of the second subset by the total quantity of time.

15. The method of claim 1, wherein the content identifier comprises at least one of a channel identifier, an application identifier, or a content title.

16. The method of claim 1, wherein the duration of each content output session of the plurality of content output sessions comprises at least one of a total time of content output for each session or a start time and an end time for each session.

17. The method of claim 1, wherein the received data is associated with a first application of a plurality of applications.

18. The method of claim 17, wherein the device identifier is received from another application of the plurality of applications.

19. A method comprising:
receiving data indicative of a plurality of content output sessions associated with a first time period, wherein the data indicates a content identifier, a device identifier, and a duration for each content output session;
determining, based on the received data, a first subset of the plurality of content output sessions that are outlier sessions;
classifying each device associated with a device identifier in the first subset of the plurality of content output sessions, as an outlier device or an inlier device using at least one of a gradient descent algorithm or a time decay algorithm;
determining, based on the classification, a second subset of the first subset of content output sessions that are associated with an outlier device;
comparing, for each content output session of the second subset, the duration of the content output session to a duration threshold associated with a second time period; and adjusting, based on the comparison, a total duration of the content output sessions of the second subset.

\* \* \* \* \*